United States Patent

Schnall

[11] 4,274,433
[45] Jun. 23, 1981

[54] PACKED PLUG FOR A FLUID VALVE

[75] Inventor: Ira H. Schnall, Erie, Pa.

[73] Assignee: White Consolidated Industries, Inc., Cleveland, Ohio

[21] Appl. No.: 157,502

[22] Filed: Jun. 9, 1980

Related U.S. Application Data

[63] Continuation of Ser. No. 956,742, Nov. 1, 1978, abandoned.

[51] Int. Cl.³ .............................................. F16K 39/02
[52] U.S. Cl. ................................ 137/454.6; 251/191; 251/282
[58] Field of Search ............... 251/191, 282, 324; 137/454.2, 454.6

[56] References Cited

U.S. PATENT DOCUMENTS

| 2,886,283 | 5/1959 | Natho | 251/282 |
|---|---|---|---|
| 3,211,419 | 10/1965 | Klinger-Lohr | 251/191 |
| 3,601,147 | 8/1971 | Myers | 251/282 |
| 3,658,083 | 4/1972 | Fetterolf et al. | 251/189 |
| 3,722,860 | 3/1973 | Curran | 251/282 |
| 3,805,839 | 4/1974 | Baumann | 251/282 |

FOREIGN PATENT DOCUMENTS

| 1240350 | 7/1960 | France | 251/282 |
|---|---|---|---|
| 411404 | 8/1945 | Italy | 251/282 |
| 521103 | 5/1940 | United Kingdom | 251/282 |

Primary Examiner—Martin P. Schwadron
Assistant Examiner—H. Jay Spiegel
Attorney, Agent, or Firm—Mandeville and Schweitzer

[57] ABSTRACT

In a valve structure, a valve plug apparatus to provide a leak-tight valve shut-off, is disclosed. The valve structure includes a valve body provided with an inlet passage, an outlet passage and an internal web portion intermediate the inlet and outlet passages. A closeable passage-forming means is arranged in the web portion and a two-member valve plug is mounted on a valve stem for controlled axial movement within the web portion and operable to close said closeable fluid passage-forming means to shut the valve. In accordance with the invention, the two-member valve plug comprises a lower plug member and an upper plug member which are in a generally axially spaced relation on the valve stem. Packing means is held in a snug-fitting condition between the lower and upper plug members by an axially resilient member which acts between one end of the valve stem and the valve plug to urge the lower and upper plug members together. When the two-member valve plug closes the closeable fluid passage-forming means, a force is transmitted by the valve stem directly through the upper plug member to the packing means to form a leak-tight seal for the valve plug. The stem force is also transmitted through the packing means and lower plug member to generate a seating force between the valve plug and closeable fluid passage-forming for a tight valve shut-off.

10 Claims, 4 Drawing Figures

PACKED PLUG FOR A FLUID VALVE

This is a continuation of application Ser. No. 956,742, filed Nov. 1, 1978, now abandoned.

BACKGROUND AND SUMMARY OF THE INVENTION

The present invention is related to a packed plug for a fluid valve and more particularly to a novel means for maintaining a tight shut-off for the valve with a low stem force.

In the proper operation of a fluid control valve, it is highly advantageous for the valve structure to include a means to provide a tight valve shut-off without requiring high loading forces on the stem. It is evident that a tight valve shut-off is desireable for an effective valve action. When the closed condition of the valve is not functional to stop all fluid flow, the valve is inadequate in one of its primary objectives, that is to stop fluid flow through a system. Yet, for a convenient and easy valve action, it is desireable to maintain a tight valve shut-off with a minimum loading force on the valve stem. Consequently, the prior art has proposed several valve structures for maintaining leak-tight sealing between the valve plug and the valve body, without a high stem force. For example, an "O"-ring seal has been mounted outside of the plug to prevent leakage between the plug and the valve body. A disadvantage of this approach, however, is that the "O" ring is effective only at low temperature operations. In other prior art devices, piston rings have been utilized as sealing elements. However, these valves have proven to be limited in their versatility inasmuch as the piston rings are inadequate to prevent leakage in some applications. In still other prior art devices, the valve includes a double-seated plug which has been found to be unsatisfactory due to the fact that the valve stem must maintain a seating force on two valve seats simultaneously.

It is a primary objective of the present invention to provide a valve capable of a leak-tight shut-off with a minimum force on the valve stem and which at the same time overcomes the disadvantage of the above-discussed prior art devices. Generally, the valve of the present invention comprises a valve body including an inlet passage, an outlet passage and an internal web portion. Mounted within the web portion and in a sealed relation to the walls of the valve body is a cylindrical member provided with large fluid passageways whereby fluid flow through the valve enters through the input passage and flows through the fluid passageways of the cylindrical member to the outlet passage. One of the passageways is provided with a tapered annular valve seat. A valve plug is mounted for controlled axial movement within the confines of the cylindrical member. The lowermost end of the valve plug is provided with a tapered annular valve surface which is arranged for cooperation with the valve seat to close the valve.

In accordance with the invention, the valve plug comprises an upper plug member and a lower plug member, each fastened to a valve stem arranged to impart controlled axial movement to the two-member plug. The two plug members are mounted in an axially spaced relation to each other and a packing element is held in a snug fit between the members to provide a sealing element for the valve plug at the interface thereof with the interior wall surface of the cylindrical member. The lower valve plug member is of a generally inverted cup-shaped configuration including the tapered annular valve surface of the plug at the open lowermost end thereof. The valve stem extends within the confines of the cup-shaped, lower valve plug member, and an axially resilient element acts between the end of the valve stem and the lower valve plug member to urge the lower valve plug member toward the upper valve plug member, thereby maintaining the packing element in the snug-fitting mount between the plug members.

To advantage, passage-forming means are provided in each of the valve plug members to permit a leakage of fluid above the valve plug. This will allow balancing of the fluid pressure above and below the valve plug to facilitate operation of the valve. In a specific embodiment of the present invention, a slight area unbalance is provided between the upper and lower surfaces of the valve plug whereby the inlet pressure is continuously acting to force the lower valve plug member upwardly against the stem thereby assisting the axially resilient member to maintain the snug fit of the packing element between the upper and lower valve plug members.

In the operation of the valve, the axially resilient member always acts to generate a light packing load on the seal. However, when the valve plug is in its lowermost position, the annular valve surface will mate with the valve seat to close the valve, and the axial force exerted by the valve stem will be transmitted directly through the upper valve plug member and packing element to the lower valve plug member. The stem force will provide the necessary compression for a leak-tight sealing by the packing element as well as the main contact load necessary for a tight shut-off at the valve seat.

For a more complete understanding of these and other features and advantages of the present invention, reference should be made to the following detailed description of preferred embodiments of the invention and to the accompanying drawings.

DETAILED DESCRIPTION OF PREFERRED EMBODIMENTS OF THE INVENTION

Figure 1:
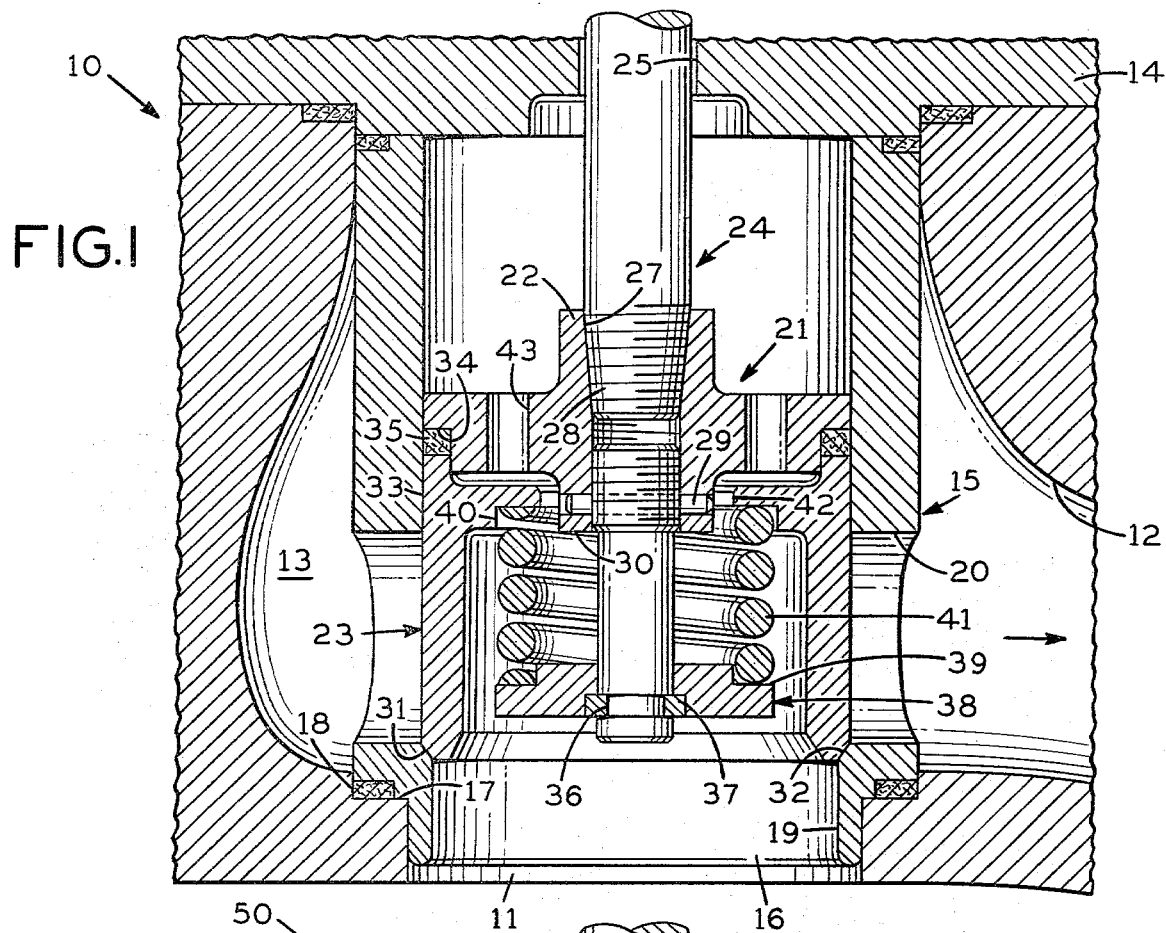
FIG. 1 is a longitudinal cross-sectional view of a valve constructed in accordance with the principles of the present invention.

Referring now to FIG. 1, there is illustrated a valve body designated generally by the reference numeral 10. The valve body 10 includes an inlet passage 11, outlet passage 12 and an internal web portion 13. A bonnet 14 is mounted over the top of the valve body 10 and in a sealed relation to the internal web portion 13 whereby a closed fluid path is formed between the inlet passage 11 and outlet passage 12. A cylindrical member 15 is mounted within the internal web portion 13 with one end thereof being in a sealed relation to the bonnet 14 and the other end thereof including an extension 16 of reduced diameter which is received within the inlet passage 11. A seat 17 is formed at the upper end of the inlet passage 11 to receive the portion 18 of the cylindrical member 15 adjacent the extension 16 in sealed relation. The cylindrical member 15 includes a central passage 19 communicating with the inlet passage 11 and horizontally disposed openings 20 communicating with the outlet passage 12 whereby fluid flowing through the inlet passage 11 may flow through the passage 19 of the cylindrical member 15 and out the opening 20 to the outlet passage 12.

In accordance with the invention, a two-member valve plug 21 is arranged for controlled axial movement within the cylindrical member 15. The valve plug 21 comprises an upper plug member 22 and a lower plug member 23. The upper plug member 22 includes a centrally disposed opening 27 which is threadedly received over a predetermined threaded portion of a valve stem 24 for a rigid connection therewith. The valve stem 24 may also include a tapered portion 28. There may also be a pin connection 29 between the upper plug member 22 and valve stem 24 to increase the strength of the rigid connection therebetween. The valve stem 24 passes through an opening 25 formed in the bonnet 14 and extends outside of the valve body 10 for connection to a conventional control means (not shown) as for example, a threaded handwheel. In this manner, the valve stem 24 may be axially displaced to impart a controlled axial movement to the valve plug 21.

A lower extension 30 of the upper plug member 22 is concentric with the valve stem 24 and arranged whereby the lower plug member 23 is slidably received thereover. The lower plug member 23 is a generally inverted cup-shaped member and includes a tapered valve surface 31 at its lowermost end. The tapered surface 31 is arranged to mate with a tapered annular valve seat 32 formed at the upper end of the passage 19 of the cylindrical member 15 when the valve plug 21 is in its lowermost position to close the valve. The lower plug member 23 includes an upwardly extending cylindrical portion 33 and is arranged to be slidably received in a recess 34 formed in the upper plug member 22 adjacent the interior wall of the cylindrical member 15. A packing element 35 is also received within the recess 34 in a snug manner between the extension 33 of the lower plug member 23 and the upper plug member 22 to form a light seal between the valve plug 21 and the interior wall of the cylindrical member 15.

In accordance with the invention, the valve stem 24 extends beyond the upper plug member 22 and into the confines of the cup-shaped lower plug member 23. A circular groove 36 is formed in the valve stem 24 adjacent the lower end thereof and is arranged to securely mount a retainer 37. The retainer 37 extends beyond the outer surface of the valve stem 24 and engages a collar 38. The collar 38 includes an annular step portion 39 of generally "L"-shaped cross-sectional configuration.

An annular recess 40 is formed at the top of the cup-shaped interior defined by the lower plug member 23. A mechanical coil spring 41 is mounted between the annular step portion 39 of the collar 38 and the recess 40 in the lower valve plug member 23. The mechanical spring 41 will act between the collar 38 and lower plug member 23 to urge the plug member 23 upwardly towards the upper plug member 22 whereby the annular extension 33 of the lower plug member 23 will compress the packing element 35 to provide a light seal between the valve plug 21 and cylindrical member 15 in all axial positions of the valve plug 21.

When the valve plug 21 is moved into its closed position, the axial force of the valve stem 24 is transmitted through the upper plug member 22, the packing element 35 and lower plug member 23 to the annular valve surface 32 to maintain a tight shut-off of the valve. The transmission of the stem force directly through the packing 35 compresses the packing and establishes a leak-tight seal between the packing 35 and the cylindrical member 15. Openings 42, 43 are formed through the plug members 22, 23, permitting fluid to pass up through and above the valve plug 21 to help balance the plug 21 during operation of the valve.

Figure 2:
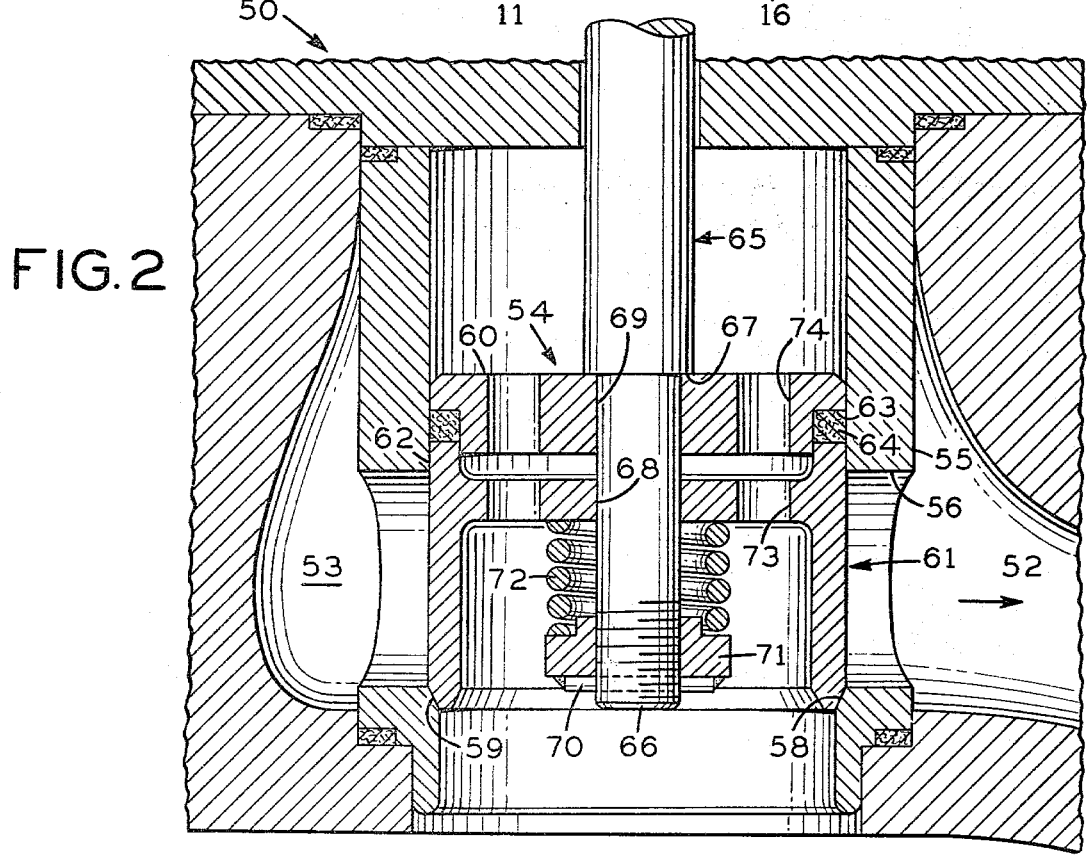
FIG. 2 is a longitudinal cross-sectional view illustrating a modification of the valve of FIG. 1.

In a modification of the valve of FIG. 1, as illustrated in FIG. 2, a valve body 50 includes an inlet passage 51 and an outlet passage 52 and an internal web portion 53. As in the prior embodiment, a two-part valve plug 54 is arranged for a controlled axial movement within a cylindrical member 55 mounted in a sealed relation within the internal web 53. The cylindrical member 55 includes a horizontally disposed passage 56 and an axially disposed passage 57 to facilitate fluid flow from the inlet passage to the outlet passage of the valve. A tapered annular valve seat 58 is formed at the upper perimeter of the axially disposed passage 57 and is arranged for a mating relation with a tapered annular valve surface 59 formed at the lower end of the valve plug 54. The upper plug member 60 and lower cup-shaped plug member 61 of the valve plug 54 are mounted whereby an upwardly extending cylindrical portion 62 of the lower plug member 61 is received in an annular recess 63 formed in the upper plug member 60, and a packing element 64 is held in a snug fit between the cylindrical extension 62 and the confines of the annular recess 63. This will form a light seal between the valve plug 54 and the interior wall of the cylindrical member 55.

A valve stem 65 is arranged for controlled axial movement within the cylindrical member 55 and includes a forwardmost portion 66 of reduced diameter and a shoulder 67 between the portion 66 and the remaining portion of the stem 65. Each of the plug members 60, 61 includes a centrally disposed opening 68, 69, respectively, whereby the valve plug 54 may be slidably received over the end portion 66 of the valve stem and seated against the shoulder 67.

A retainer pin 70 is securely mounted at the lowermost portion of the valve stem 65 and engages a collar 71, which is threadedly received on the portion 66 of the valve stem 65. A coil spring 72 is mounted between the collar 71 and the lower plug member 61 and acts between these two elements to urge the lower plug member 61 upward towards the upper plug member 60, whereby the packing element 64 is held in a snug relation between the valve plug 54 and the wall of the cylindrical member 55.

Openings 73, 74 are formed through the plug members 60, 61 to permit passage of fluid above the valve plug 54 to maintain a balanced operation of the valve.

To advantage, the above described modification of the valve of FIG. 1 achieves the advantages of the valve of the present invention with a construction that facilitates a straightforward and inexpensive manufacturing process. The valve stem 65 may be formed by simple machining operations and the plug 54 assembled by sliding the upper and lower members 60, 61 over the stem 65 and seated against the shoulder 67. When the valve is closed, the stem force is transmitted to the upper plug member 60 by the shoulder 67. This will cause the upper plug member 60 to compress the packing element 64 against the extension 62 to form a leak-tight seal between the valve plug 54 and cylindrical member 55. The stem force will also be transmitted through the packing element 64 and lower plug member 61 to the valve surface 59 to provide a tight shut-off.

Figure 3:
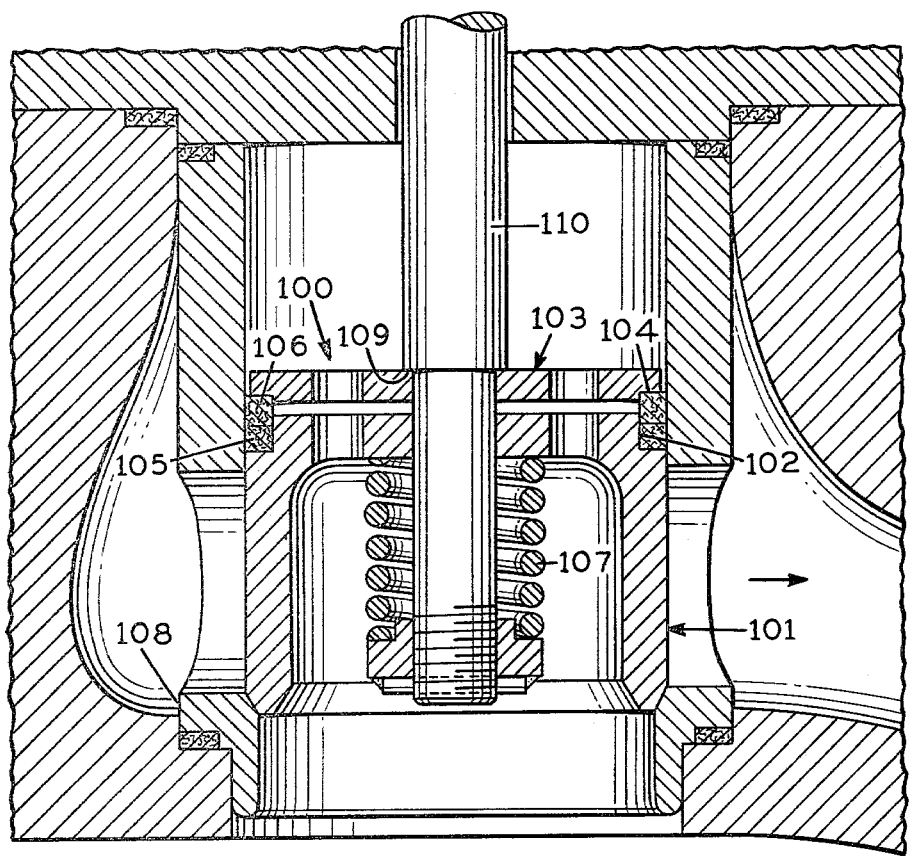
FIG. 3 is a longitudinal cross-sectional view of another embodiment of a valve built in accordance with the teachings of the present invention.

Referring now to FIG. 3, there is illustrated another embodiment of the packed valve plug of the present invention. The details of construction of the valve of FIG. 3 are substantially similar to the valve depicted in FIG. 2. However, rather than the packing element being retained in the upper plug member and held by the lower plug member, the opposite approach is utilized. The lower plug member 101 of the valve plug 100 includes an annular recess 102 around the upper perimeter thereof, and the upper plug member 103 is provided with an annular recess 104 in a confronting relation to the recess 102. Packing elements 105, 106 are received in the annular recess 102 and the packing element 105 extends up above the lower plug member 101 and into a tight fit with the recess 104 of the upper plug member 103. The force of a mechanical spring 107 will tend to compress the packing elements 105, 106 between the plug members 101, 103 to form a light seal between the valve plug 100 and cylindrical member 108. As in the prior embodiment, the upper plug member 103 will be retained against upper axial displacement by a shoulder 109 formed in the valve stem 110. This arrangement simplifies the configuration of the plug members 101, 103 and thereby further reduces the manufacturing expenses of the valve while maintaining the advantages taught by the present invention.

Figure 4:
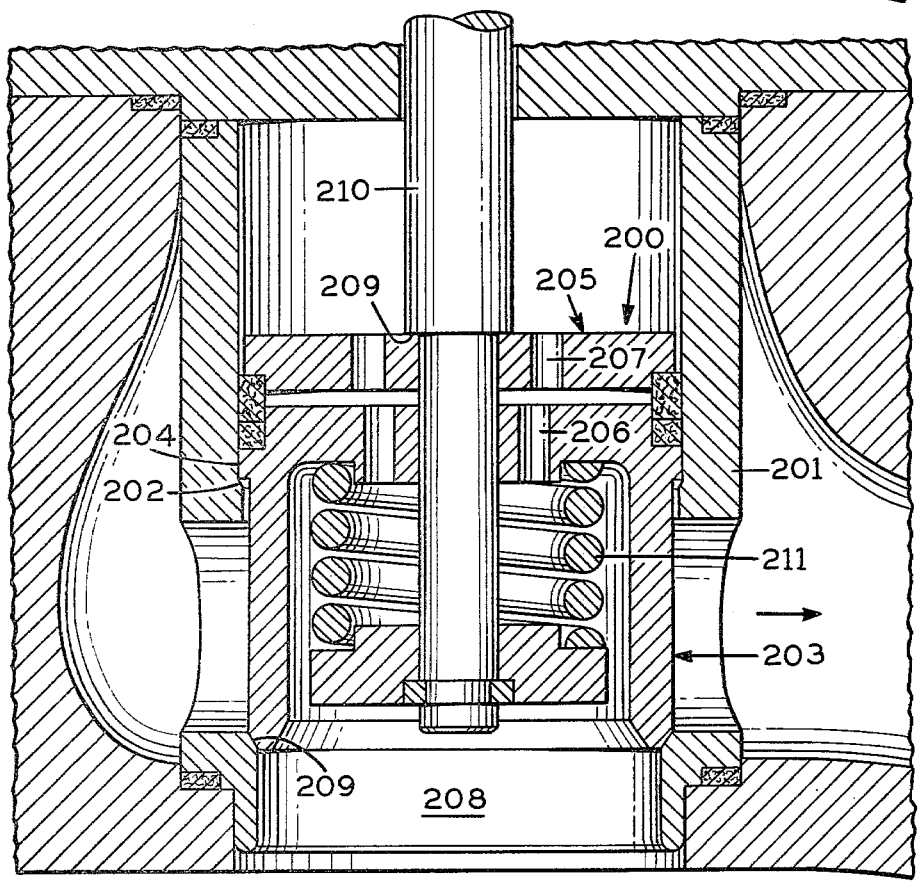
FIG. 4 is a longitudinal cross-sectional view of a modification of the valve of FIG. 3.

In the embodiment of the invention illustrated in FIG. 4, a slight area unbalance is provided between the upper and lower surfaces of the valve plug 200. The cylindrical member 201 is provided with a stepped portion 202. The lower plug member 203 is configured whereby a portion of enlarged diameter 204 confronts the portion 202 when the valve is in a fully closed position leaving a small fluid space between the lower plug member 203 and cylindrical member 201. The diameter of the upper plug member 205 is substantially equal to the diameter of the portion 204 of enlarged diameter. Passage-forming means 206, 207 are formed in the lower plug member 204 and upper plug member 205, respectively, whereby high pressure fluid entering through the inlet portion 208 of the valve may pass through the passage-forming means 206, 207 to the volume of the cylindrical member 201 above the valve plug 200. This arrangement will provide a slight pressure unbalance between the cross-sectional area of the valve plug 200 facing the inlet passage 208 and the cross-sectional area of the upper surface of the plug 200 whereby the high inlet pressure will continuously act to force the slidable valve plug members 204, 205 against the valve seat 209, thereby assisting the valve stem in maintaining the valve plug 200 in a tightly closed condition.

Each of the embodiments of the present invention described above offer a highly effective means for maintaining a leak-tight seal between the valve plug and the internal structure of the valve body. The inventive concept of a two-member valve plug mounting a packing element between the members and an axially resilient means urging the plug members together provides a light seal for all open positions of the valve plug and with a minimum loading force for the valve stem. When the valve is in a closed position, the two-member plug provides an ideal construction to transmit the stem force to the valve seat. At the same time, the distribution of stem force through the two plug members compresses the members together whereby the packing element is held in a leak-tight sealing relation to the cylindrical member of the valve. Therefore, the embodiments illustrated herein provide a straightforward arrangement and facilitate easy manufacture and maintenance, while providing a highly advantageous valve operation.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In a valve structure including a valve body having an inlet and outlet passage and an internal web portion intermediate the inlet and outlet passages, means arranged in said web portion forming a closeable flow path between said inlet and outlet passages, and a valve stem associated with said web portion, a valve plug apparatus to provide a leak-tight valve shut-off, characterized by
    (a) a two-member valve plug comprising a lower plug member and an upper plug member,
    (b) said lower and upper plug members being mounted in a generally axially spaced relation on said valve stem, whereby said two-member valve plug is controllable by the valve stem to close said closeable flow path means,
    (c) packing means arranged between and held by said lower and upper plug members,
    (d) at least one of said plug members being slidably associated with said valve stem whereby the relative axial orientation of the plug members is variable to vary the holding force on said packing means, and
    (e) means associated with said two-member valve plug operative upon said lower and upper plug members and said packing means whereby the packing means is maintained in a snug fit between the lower and upper plug members for all axial positions of said valve stem,
    (f) said valve stem being in a direct, force-transmitting relation with said upper plug member and said upper plug member only when said valve and valve stem are in fully closed positions for all axial positions of the valve stem after the valve is in said fully closed position whereby the force produced by the valve stem when the valve and stem are in said fully closed positions will be transmitted solely and directly through said upper plug member to urge the two plug members together with a force proportional to the closing force applied by said stem thereby increasing the holding force on the packing means in proportion to the closing force applied by said stem for all axial positions of the valve stem after the valve is in said fully closed position to form a leak-tight seal around the valve plug and through the packing means to the lower plug member to provide a tight valve shut-off.

2. The apparatus according to claim 1, further characterized by
    (a) said closeable flow path means including a tapered, annular valve seat, (b) said lower plug member comprising an inverted, generally cup-shaped member including a tapered annular valve surface arranged for a mating relationship with said annular valve seat to close said valve structure, (c) said valve stem extending into the confines of said cup-shaped lower plug member, and (d) said axially resilient member comprising a mechanical coil spring acting between the end of the valve stem within the confines of the lower plug member and said lower plug member.

3. The apparatus according to claim 2, further characterized by (a) said closeable flow path means comprising a cylindrical member mounted within said web portion and including fluid flow openings forming a fluid flow path between said inlet and outlet passages, (b) said tapered, annular valve seat being formed at one of said fluid flow openings, (c) said upper and lower plug members being arranged for axial movement in a snug fit within said cylindrical member, (d) said packing means comprising an annular packing element held in a snug fit between the upper and lower plug members.

4. The apparatus according to claim 3, further characterized by (a) said upper plug member including an open-ended recess formed at the perimeter thereof and defining an annular slot with said cylindrical member, (b) said annular packing element being received in said annular slot, and (c) said lower plug member including an upwardly extending cylindrical portion arranged for reception in said annular slot whereby the force of said mechanical coil spring will urge said cylindrical extension into said slot thereby securing said packing element within said annular slot.

5. The apparatus according to claim 3, further characterized by (a) said lower plug member including an open-ended recess at the perimeter thereof and defining an annular slot with said cylindrical member, (b) said annular packing element being partially received in said slot, and (c) said upper plug member being in a contacting relation to said packing element whereby the force of said mechanical coil spring will urge said lower plug member upwardly towards said upper plug member to provide a hold on said packing element.

6. The apparatus according to claim 3, further characterized by (a) said valve stem including an annular shoulder, (b) said upper plug member being slidably received over said valve stem and seated against said shoulder whereby the force of the upwardly urged lower plug member will secure said upper plug member against said shoulder.

7. The apparatus according to claim 1, further characterized by (a) said valve stem including a threaded portion, and (b) said upper plug member being threadedly received over said threaded portion of the valve stem.

8. The apparatus according to claim 7, further characterized by (a) said valve stem being tapered adjacent the area of said threaded portion.

9. In a valve structure, a valve plug apparatus to provide a leak-tight shut-off, which comprises (a) a valve body including an inlet passage and an outlet passage and an internal web portion intermediate the inlet and outlet passages, (b) a two-member valve plug arranged for controlled axial movement within said web portion to open and close said valve structure, (c) sealing means being mounted between the two members of said valve plug, (d) means to urge said two members together to maintain said sealing means in a snug-fitting relation between said two plug members, and (e) means to apply additional pressure to the sealing means when the valve is closed to form a leak-tight seal between the two-member valve plug and valve structure when the valve is in the closed condition.

10. The apparatus of claim 1, further characterized by (a) said two-member valve plug including means to balance the valve plug whereby fluid pressure differentials within said valve structure will act to urge said two members together.

* * * * *

UNITED STATES PATENT AND TRADEMARK OFFICE
CERTIFICATE OF CORRECTION

PATENT NO. : 4,274,433
DATED : June 23, 1981
INVENTOR(S) : IRA H. SCHNALL

It is certified that error appears in the above-identified patent and that said Letters Patent are hereby corrected as shown below:

In column 8, delete lines 24-40, inclusive.

On the Title Page, "10 Claims" should read

-- 9 Claims --.

Signed and Sealed this

Twenty-second Day of September 1981

[SEAL]

Attest:

Attesting Officer

GERALD J. MOSSINGHOFF

Commissioner of Patents and Trademarks